United States Patent Office
3,032,201
Patented May 1, 1962

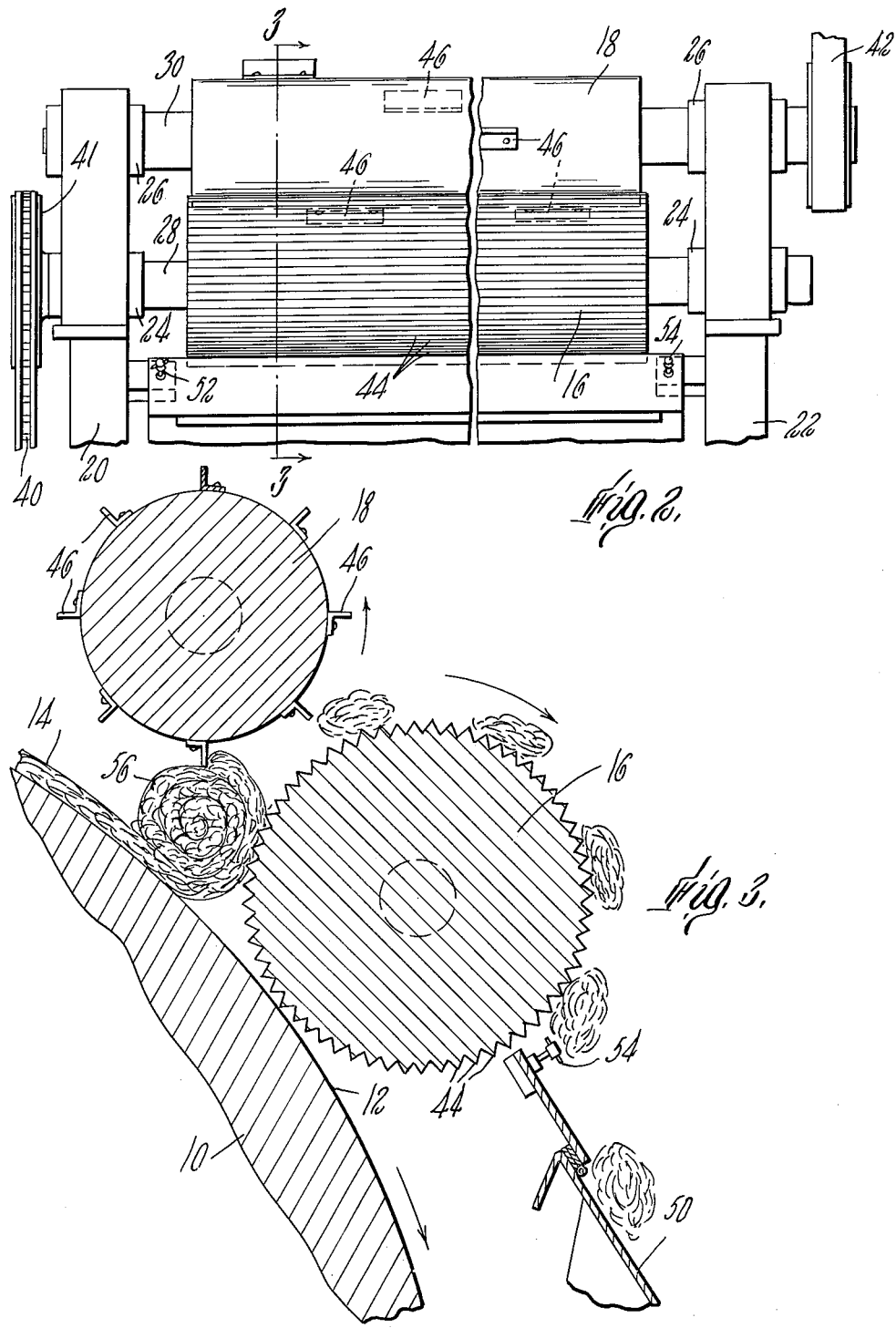

3,032,201
DISCHARGE FOR A CONTINUOUS ROTARY FILTER
John P. Rich, Nashua, N.H., assignor to Improved Machinery Inc., Nashua, N.H., a corporation of Maine
Filed Nov. 10, 1958, Ser. No. 772,928
1 Claim. (Cl. 210—386)

This invention relates to continuous rotary filters, and more particularly to a rotary filter structure particularly suitable for the discharging of ground wood pulp.

The type of filter frequently utilized during the treatment of ground wood pulp is a rotary drum filter. Such a filter typically comprises a large cylindrical drum structure mounted horizontally for rotation on its axis. The drum is suspended above a tank such that a lower portion thereof may be submerged in the materials to be filtered. Application of an inwardly directed pressure differential to the foraminous surface of the drum causes material to adhere thereto in the form of a filter cake, the suspending liquid being extracted from the material and drawn through the drum surface into the interior of the drum under the influence of the pressure differential.

Various means have been utilized for removing or discharging the filter cake from the drum, ground wood pulp in particular presenting a difficult removal problem because of its wet, low strength, short fibered structure. The pulp tends to stick to the drum as well as to the discharger elements employed. This problem arises especially in drums utilizing a single axially extending discharge roll. Such a roll causes the pulp to roll up like a snowball in a cylinder and in practice that cylinder periodically passes over the discharge roll and thus the pulp is transferred in a large mass to the water which it is to suspend the pulp during transfer to the next process stage. In this type of discharger the most efficient removal of ground wood pulp from the drum is accomplished when the "snowball" is present and therefore this periodic discharge of the entire snowball produces an inefficient discharge operation. Also, the discharged ball of pulp has a tendency to remain in that form rather than readily going into suspension in the water. The resulting non-uniform suspension impairs the transport of the pulp to succeeding stages. Axial dischargers, which comprise a scroll roll mounted above and adjacent the discharge roll, are not an effective solution to the problem because the filter cake is compressed in its axial movement and is discharged in compressed discrete lumps which do not readily return to suspension as required.

Accordingly, it is an object of this invention to provide an improved rotary drum filter discharge apparatus which is particularly suitable for use with ground wood pulp filtering systems.

Another object of the invention is to provide an improved rotary drum filter discharger which permits a substantially continuous discharge of filter cake in a radial manner over the entire length of the drum.

A particular object of the invention is to provide in a rotary drum filter having a discharge roll which is mounted across and immediately adjacent the descending surface of the drum for rotation in the same direction as the drum, means comprising a second roll mounted above and to the rear of the discharge roll for rotation in the opposite direction, the discharge roll causing the cake carried by the drum to be removed therefrom and to roll upon itself in snowball fashion and the second roll acting to maintain that snowball of filter cake in position while removing portions thereof and radially discharging them over the entire axial length of the discharge apparatus.

Other objects and features of the invention will become apparent as the following description of the preferred embodiment of the invention progresses, in conjunction with the drawings, in which:

FIG. 2 is a side view of the drum filter mechanism and discharge apparatus of FIG. 1; and FIG. 3 is a sectional view taken along the line 3—3 of FIG. 2 showing the operation of the discharge apparatus in removing ground wood pulp filter cake from the filter drum.

Figure 1:
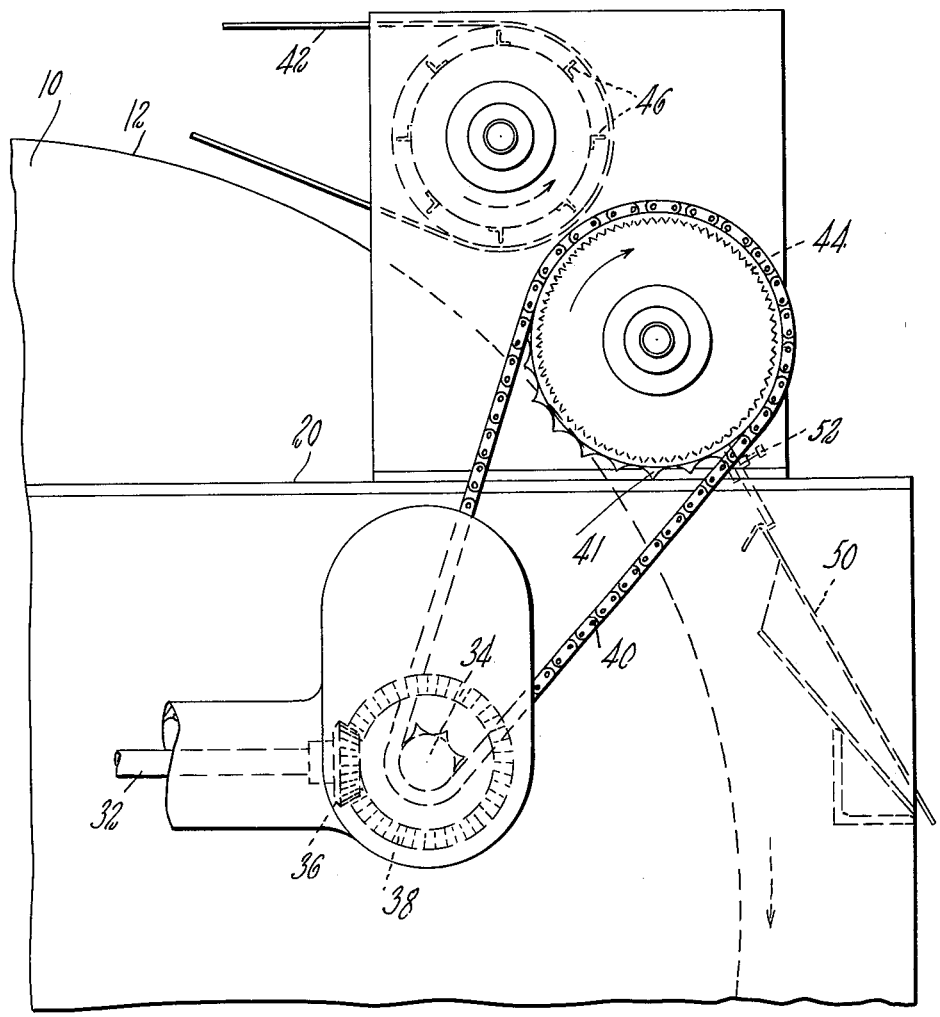
FIG. 1 is an end view of a portion of the rotary drum filter mechanism with a novel discharge mechanism mounted adjacent thereto.

As shown in FIGS. 1 and 2, the discharge apparatus according to the preferred embodiment of the invention is associated with a conventional rotary drum filter. The drum 10 of the filter has a foraminous cylindrical surface 12 to which an inwardly directed pressure differential is applied. The drum is supported by a shaft in a conventional manner such that a lower portion thereof is suspended in a tank (not shown) which contains the slurry to be filtered. The drum is rotatably driven in clockwise direction as viewed in FIG. 1. An inwardly directed pressure differential, applied to the drum surface, causes the slurry to be attracted to that surface. The material to be removed from the slurry is extracted through the surface of the interior of the drum and the remaining particles of the slurry adhere in a layer to the drum surface as a filter cake 14.

Mounted adjacent the drum surface on the descending side of the drum are two rolls 16, 18. These rolls extend the length of the drum, parallel to its axis. A pedestal support 20, 22 is positioned on either end of the drum. Mounted on each of the pedestal supports are two sets of bearings 24 and 26. The shaft 28 of roll 16 is journaled in the bearings 24 and the shaft 30 of roll 18 is journaled in the bearings 26.

The roll 16 is driven by a chain drive and gearing. A shaft 32, driven by appropriate means (typically the filter drum drive) rotates sprocket 34 through pinion gears 36 and 38. A chain 40 cooperates with the sprocket 34 to rotate sprocket 41 which is secured to the shaft 28 of roll 16 in driving relationship. The roll 16 is driven in the same direction as the drum 10.

The second roll 18, which is positioned above and to the rear of roll 16, is independently driven by appropriate means such as an electric motor (not shown) through belt drive 42. This second roll is preferably driven at a constant speed irrespective of the speed of the drum or the first roll for reasons which will appear hereinafter. Its direction of rotation is opposite to that of the drum and the first roll, i.e., counterclockwise as viewed in FIG. 1.

The roll 16 is provided with a plurality of axially extending vanes or corrugations 44 and the roll 18 has a plurality of projections or angles 46 spaced about it and along over its entire length. In this embodiment short lengths of angles are mounted on the roll in selected locations about the periphery and are placed such that they extend the length of the roll. These projecting elements are randomly spaced in multiples of 45° about the periphery of the roll 18 and overlap each other along the length of the roll. The location of the projecting elements however may be varied as desired in accordance with the application of the discharger. A running clearance is provided between the drum surface and the vaned discharge roll 16. A substantially larger clearance exists between the drum and the second roll 18 to permit accumulation of a substantial snowball therebetween, however.

A stock slide 50 is positioned adjacent the descending side of the roll 16 to receive the discharged filter cake. Thumb screws 52 and 54 are provided to secure the stock slide in place adjacent the discharge roll. These screws may be loosened if desired in order to adjust the position of the slide or to obtain access to the filter drum surface.

The operation of the discharge apparatus may be understood with reference to FIG. 3. In operation filter cake 14, accumulated on the surface 12 of the drum, is removed from that surface and rolled up into a longitudinal roll 56, similar in manner to the rolling of a snowball. This snowballing accumulation of the filter cake is accomplished by cooperation of the vaned surface of the discharge roll 16 with the drum surface 12. As mentioned above, the removal of filter cake comprised of ground wood pulp from the drum surface is accomplished in the most efficient and thorough manner where the accumulated "snowball" is present.

In order to maintain that "snowball" in position and prevent its periodic discharge after the roll 16, the second roll 18 is mounted above and to the rear of the discharge roll 16. As the snowball 56 increases in size the projections 46 contact the outer surfaces of the snowball and remove portions of it such that they are discharged outwardly over the discharge roll 16 and onto the stock slide 50. The rotational speed of the roll 18 is preferably controlled such that it revolves at a constant speed irrespective of the rate of formation of the snowball. This speed, dependent in part on the nature of the material being removed from the filter drum surface, should be a speed which maintains the snowball at its preferred size without imparting excessive velocity to the removed particles.

The discharger apparatus of the invention thus maintains the roll of filter cake in position while radially removing portions of it in a substantially continuous manner over the entire axial length of the drum, ground wood pulp filter cake removed in this manner having the characteristic that it readily returns to suspension in water.

While a preferred embodiment of the invention has been shown and described herein it is not intended that the invention be limited thereto or to details thereof and departures may be made therefrom within the spirit and scope of the invention as defined in the following claim.

I claim:

Apparatus for discharging filter cake, in the form of a layer of wet, cohesive solids, from the drum of a continuous rotary drum filter comprising, in combination with a rotary drum filter, a vaned discharge roll mounted immediately adjacent and parallel to the face of the filter drum on the descending side thereof, means for rotating said discharge roll in the same direction as the rotation of said drum, said discharge roll cooperating with the descending side of said drum to cause said layer of solids to accumulate in a roll between the descending side of said drum and the ascending side of said discharge roll, and means for removing discrete portions of the roll of solids and discharging the same in a direction perpendicular to the axis of rotation of said drum filter over said discharge roll, said means including a second roll having a plurality of axially extending projections thereon extending longitudinally thereof, said projections being of a length substantially less than the length of said second roll and being spaced from each other along the axis of said second roll, and spaced around the periphery thereof, said second roll being mounted parallel to and adjacent the descending side of said drum and above said discharge roll, means for rotating said second roll at a substantially constant speed independent of the speed of the drum in the opposite direction as the rotation of said drum, said drum and said second roll coacting with said discharge roll to maintain said roll of solids between said drum and said discharge roll while substantially continuously discharging discrete portions thereof in a direction perpendicular to the axis of rotation of said drum and over said discharge roll from a plurality of points over the entire axial length of said discharge roll.

References Cited in the file of this patent
UNITED STATES PATENTS

| | | |
|---|---|---|
| 1,812,648 | Gardella | June 30, 1931 |
| 2,060,896 | Raisch | Nov. 17, 1936 |
| 2,294,179 | Hawley | Aug. 25, 1942 |
| 2,446,746 | Denhard et al. | Aug. 10, 1948 |
| 2,689,654 | Ohlstrom | Sept. 21, 1954 |